(12) United States Patent
Yamai et al.

(10) Patent No.: US 11,194,434 B2
(45) Date of Patent: Dec. 7, 2021

(54) INPUT DEVICE HAVING TRANSPARENT ELECTRODES CONTAINING NANOWIRES AND DISPLAY APPARATUS WITH INPUT DEVICE

(71) Applicant: Alps Alpine Co., Ltd., Tokyo (JP)

(72) Inventors: Tomoyuki Yamai, Niigata-ken (JP); Yasuyuki Kitamura, Niigata-ken (JP); Manabu Yazawa, Niigata-ken (JP); Ken Yamamura, Niigata-ken (JP); Tomoya Kuwabara, Niigata-ken (JP); Sota Takahashi, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 16/992,504

(22) Filed: Aug. 13, 2020

(65) Prior Publication Data

US 2020/0371642 A1 Nov. 26, 2020

Related U.S. Application Data

(63) Continuation of application No. PCT/JP2019/007448, filed on Feb. 27, 2019.

(30) Foreign Application Priority Data

Mar. 23, 2018 (JP) .............................. JP2018-057019

(51) Int. Cl.
*G06F 3/044* (2006.01)
*G02F 1/1333* (2006.01)
(Continued)

(52) U.S. Cl.
CPC ........ *G06F 3/0446* (2019.05); *G02F 1/13338* (2013.01); *G02F 1/13439* (2013.01);
(Continued)

(58) Field of Classification Search
CPC ..... G06F 2200/1634; G06F 2200/0339; G06F 2200/04103; G06F 2200/04104;
(Continued)

(56) References Cited

U.S. PATENT DOCUMENTS

2008/0309635 A1 12/2008 Matsuo
2014/0022467 A1 1/2014 Chai et al.
(Continued)

FOREIGN PATENT DOCUMENTS

JP 2008-310550 12/2008
JP 2011-39759 2/2011
(Continued)

OTHER PUBLICATIONS

International Search Report dated May 7, 2019 from International Application No. PCT/JP2019/007448.

*Primary Examiner* — Sanghyuk Park
(74) *Attorney, Agent, or Firm* — Beyer Law Group LLP (57) ABSTRACT

An input device includes a plurality of first transparent electrodes, a plurality of second transparent electrodes, coupling portions each electrically connecting two adjacent second transparent electrodes of the second transparent electrodes, and bridge portions each electrically connecting two adjacent first transparent electrodes of the first transparent electrodes. The first and second transparent electrodes are arranged in directions orthogonal to each other and are formed of a material containing conductive nanowires. The bridge portions each include a bridge wiring part, an insulating layer, and a buffer layer. The buffer layer is disposed between each of the coupling portions and the insulating layer. The buffer layer is formed of a light-transmissive, inorganic oxide-based material.

9 Claims, 8 Drawing Sheets

(51) Int. Cl.
*G02F 1/1343* (2006.01)
*G06F 3/041* (2006.01)

(52) U.S. Cl.
CPC .. *G02F 1/133345* (2013.01); *G02F 1/134336* (2013.01); *G06F 3/0443* (2019.05); *G06F 3/04164* (2019.05); *G06F 2203/04103* (2013.01); *G06F 2203/04111* (2013.01)

(58) Field of Classification Search
CPC ....... G06F 3/03547; G06F 3/041–0416; G06F 3/0426; G06F 3/0428; G06F 3/0488–04886; G06F 2230/04101–04114; G06F 2230/044; G06F 2230/04809
See application file for complete search history.

(56) References Cited

U.S. PATENT DOCUMENTS

| | | | |
|---|---|---|---|
| 2015/0101919 A1* | 4/2015 | Bae | G06F 3/044 200/5 R |
| 2016/0139710 A1 | 5/2016 | Yamai et al. | |
| 2016/0320872 A1* | 11/2016 | Lee | G06F 3/0443 |
| 2018/0253170 A1 | 9/2018 | Noh et al. | |

FOREIGN PATENT DOCUMENTS

| | | |
|---|---|---|
| JP | 2013-178738 | 9/2013 |
| JP | 2014-178979 | 9/2014 |
| JP | 2018-147486 | 9/2018 |
| TW | 201243668 | 11/2012 |
| WO | 2015/019805 | 2/2015 |

* cited by examiner

INPUT DEVICE HAVING TRANSPARENT ELECTRODES CONTAINING NANOWIRES AND DISPLAY APPARATUS WITH INPUT DEVICE

CLAIM OF PRIORITY

This application is a Continuation of International Application No. PCT/JP2019/007448 filed on Feb. 27, 2019, which claims benefit of Japanese Patent Application No. 2018-057019 filed on Mar. 23, 2018. The entire contents of each application noted above are hereby incorporated by reference.

BACKGROUND OF THE INVENTION

1. Field of the Invention

The present invention relates to input devices, such as capacitive sensors, and in particular, relates to an input device including transparent electrodes formed of a material containing conductive nanowires and a display apparatus including the input device.

2. Description of the Related Art

An input device, such as a capacitive sensor included in a touch panel, includes first transparent electrodes and second transparent electrodes arranged on a substrate and bridge portions including bridge wiring parts arranged at intersections of the first and second transparent electrodes. Such a capacitive sensor is required to be adaptable to various shapes, such as a curved surface. For this reason, a material containing conductive nanowires, such as gold nanowires, silver nanowires, or copper nanowires, may be used as a material for the transparent electrodes of the capacitive sensor.

International Publication No. WO 2015/019805 discloses a light-transmissive conductive member including a conductive layer that contains silver nanowires and that is patterned to provide conductive regions and a non-conductive region exhibiting good optical properties and a method of patterning the light-transmissive conductive member. The light-transmissive conductive member includes a plurality of first electrodes formed of a material containing silver nanowires, coupling communication portions each connecting the first electrodes that are adjacent, a plurality of second electrodes arranged with the coupling communication portions therebetween, and bridge wiring parts formed of indium tin oxide (ITO) and each joining the second electrodes that are adjacent.

Japanese Unexamined Patent Application Publication No. 2013-178738 discloses an input device including bridge wiring parts that contain low-resistance metal, such as Cu, Cu alloy, or Ag alloy, and exhibit good invisibility, improved environmental resistance, and improved electrostatic breakdown resistance. In the input device, the bridge wiring parts each connect transparent electrodes that are adjacent and each have a multilayer structure including an amorphous ITO layer, a metal layer, and an amorphous ITO layer.

In an input device, such as a capacitive sensor, including transparent electrodes formed of a material containing conductive nanowires and bridge wiring parts, an insulating layer is disposed between the bridge wiring parts and the transparent electrodes to insulate the bridge wiring parts from the transparent electrodes underlying the bridge wiring parts. It is important to achieve good adhesion of the insulating layer to the transparent electrodes, good flexibility, and little or no degradation in optical properties. If the insulating layer formed of, for example, novolac resin, is disposed on the transparent electrodes containing silver nanowires, sufficient adhesion of the novolac resin to a matrix resin material of the transparent electrodes containing silver nanowires will fail to be achieved. If the insulating layer is formed of, for example, acrylic resin, in terms of good adhesion, the material forming the insulating layer may penetrate into the matrix resin material contained in the transparent electrodes, leading to degradation in optical properties of a portion where such a phenomenon has occurred.

SUMMARY OF THE INVENTION

The present invention provides an input device that includes transparent electrodes formed of a material containing conductive nanowires and bridge portions each including an insulating layer and a bridge wiring part provided for the transparent electrodes with the insulating layer therebetween in the above-described manner and that exhibits sufficient adhesion of the bridge portions to the transparent electrodes and little or no degradation in optical properties, and a display apparatus including such an input device.

An aspect of the present invention provides an input device including: a light-transmissive substrate; a plurality of first transparent electrodes arranged in a first direction in a sensing region of the substrate, the first transparent electrodes being light-transmissive and being formed of a material containing conductive nanowires; a plurality of second transparent electrodes arranged in a second direction orthogonal to the first direction in the sensing region, the second transparent electrodes being light-transmissive, being formed of a material containing conductive nanowires, and being insulated from the first transparent electrodes; coupling portions each electrically connecting two adjacent second transparent electrodes of the second transparent electrodes, the coupling portions being formed of a material containing conductive nanowires; and bridge portions arranged on the coupling portions, each of the bridge portions electrically connecting two adjacent first transparent electrodes of the first transparent electrodes. Each of the bridge portions includes a bridge wiring part joining the two adjacent first transparent electrodes, an insulating layer disposed between the bridge wiring part and the coupling portion, and a buffer layer disposed between the insulating layer and the coupling portion. The buffer layer is formed of a light-transmissive, inorganic oxide-based material.

In such a configuration, the buffer layer, which is disposed between the insulating layer of the bridge portions and the coupling portions formed of the material containing the conductive nanowires, enhances adhesion of the insulating layer to the coupling portions and reduces or eliminates degradation in optical properties. Specifically, the buffer layer, which contains an oxide-based material, exhibits good adhesion to a material (matrix resin material) forming the coupling portions and also exhibits good adhesion to the insulating layer. Furthermore, the buffer layer, which contains an inorganic material, hinders a material forming the insulating layer from penetrating into the coupling portions, thus reducing or eliminating degradation in optical properties, particularly, a reduction in invisibility of the bridge portions.

In the above-described input device, preferably, the insulating layer includes parts extending over parts of the two second transparent electrodes electrically connected by each of the coupling portions in terms of stably preventing short circuit between the bridge wiring part and the second transparent electrodes. In this case, the buffer layer may include parts located between the second transparent electrodes and the parts of the insulating layer extending over the second transparent electrodes. This reduces or eliminates separation of the insulating layer from the second transparent electrodes as well as degradation in optical properties. The insulating layer may include parts extending over parts of the two adjacent first transparent electrodes. In this case, the buffer layer may include parts located between the first transparent electrodes and the parts of the insulating layer extending over the first transparent electrodes.

In the above-described input device, the insulating layer may include parts extending over parts of the two adjacent first transparent electrodes arranged at opposite sides of each of the coupling portions. The buffer layer may include parts located between the first transparent electrodes and the parts of the insulating layer extending over the first transparent electrodes. Such a configuration ensures that a material forming the insulating layer is prevented from penetrating into electrode components.

In the above-described input device, the buffer layer may be disposed between the bridge wiring part and the first transparent electrodes. In this case, if the first transparent electrodes are covered with the buffer layer at an initial stage of a fabrication process, the buffer layer can function as a protective layer for the first transparent electrodes to prevent parts of the first transparent electrodes over which the bridge wiring part is to extend from being exposed during the fabrication process. Such arrangement makes it difficult for the conductive nanowires contained in the parts of the first transparent electrodes to deteriorate. Thus, an increase in resistance between the bridge wiring part and the first transparent electrodes is unlikely to occur. Furthermore, the buffer layer may be continuously provided between the insulating layer and the first transparent electrodes and between the bridge wiring part and the first transparent electrodes.

In the above-described input device, preferably, the inorganic oxide-based material forming the buffer layer is an amorphous material. This allows the buffer layer to be flexible.

In the above-described input device, preferably, the buffer layer is formed of at least one selected from the group consisting of amorphous ITO and amorphous indium zinc oxide (IZO). Such a configuration improves adhesion of the insulating layer to the material containing the conductive nanowires, reduces or eliminates degradation in optical properties, and allows the buffer layer to be flexible.

In the above-described input device, preferably, the conductive nanowires are at least one selected from the group consisting of gold nanowires, silver nanowires, and copper nanowires. Such a configuration allows the transparent electrodes to exhibit low resistance, improved light-transmissivity, and sufficient flexibility.

Another aspect of the present invention provides a display apparatus with an input device, the apparatus including a display panel and a touch sensor disposed on the display panel. In the display apparatus, the touch sensor includes the above-described input device. Thus, the display apparatus can be configured with the input device that exhibits excellent optical properties and is adaptable to various shapes, such as a curved surface.

DESCRIPTION OF THE PREFERRED EMBODIMENTS

An embodiment of the present invention will be described below with reference to the drawings. In the following description, the same components are designated by the same reference signs and a redundant description of the components is omitted as appropriate.

Figure 1A:
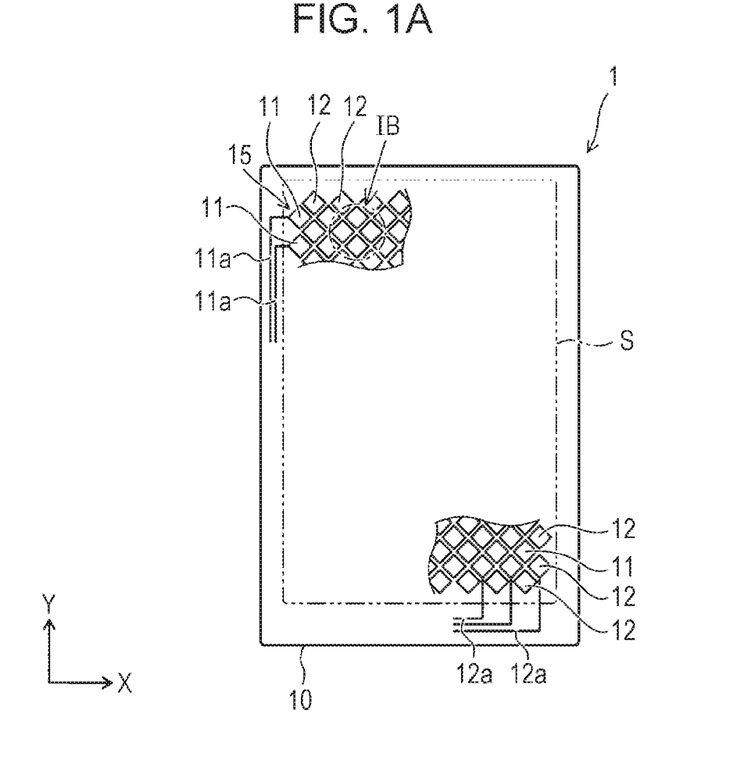
FIGS. 1A and 1B are plan views illustrating a capacitive sensor according to an embodiment.
Figure 1B:
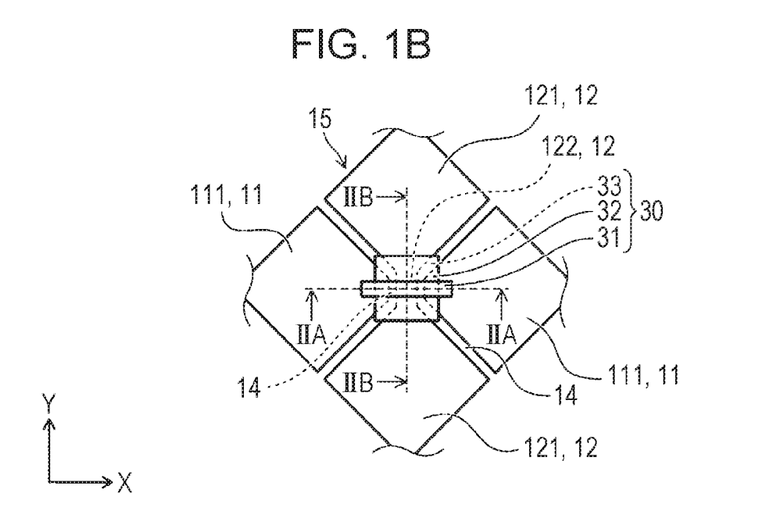
Figure 2A:
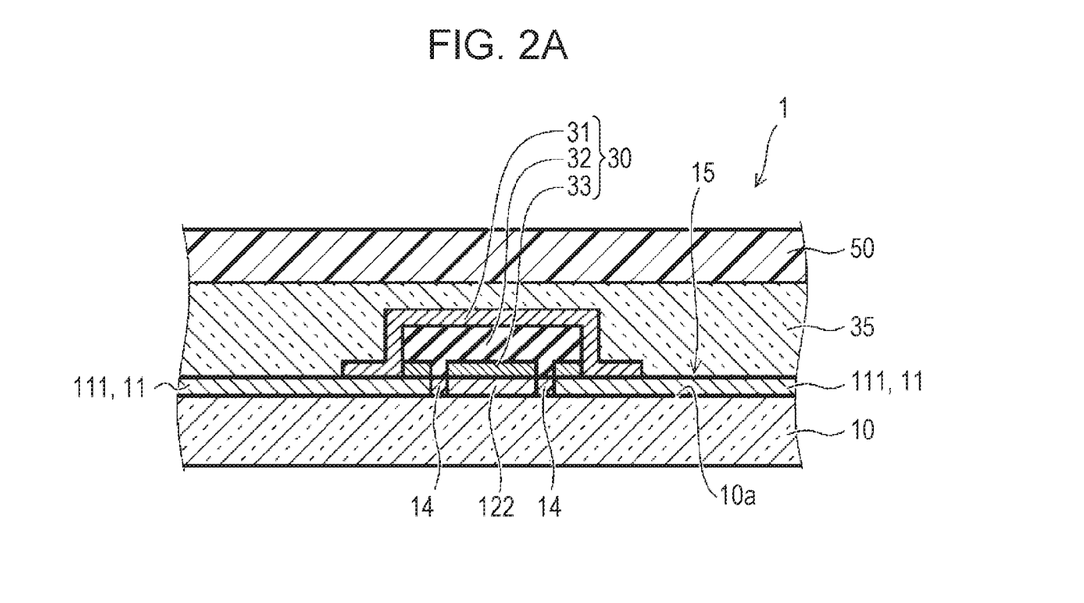
FIGS. 2A and 2B are sectional views illustrating a bridge portion of the capacitive sensor according to the embodiment.
Figure 2B:
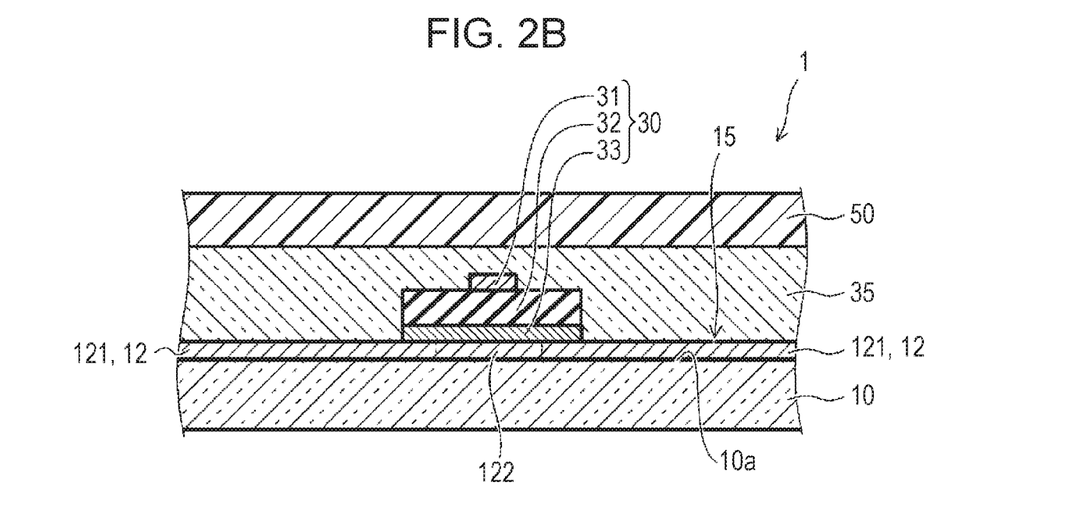

FIGS. 1A and 1B are plan views illustrating a capacitive sensor as an example of an input device according to the present embodiment. FIG. 1A is a plan view of the entire capacitive sensor. FIG. 1B is an enlarged plan view of part IB in FIG. 1A. FIGS. 2A and 2B are sectional views illustrating a bridge portion of the capacitive sensor according to this embodiment. FIG. 2A is a sectional view taken along line IIA-IIA in FIG. 1B. FIG. 2B is a sectional view taken along line IIB-IIB in FIG. 1B. As used herein, the terms "transparent" and "light-transmissive" refer to a visible light transmittance of 50% or more (preferably 80% or more). In addition, a haze of 6% or less is suitable.

As illustrated in FIG. 1A, a capacitive sensor 1 according to the embodiment includes a substrate 10 and first electrodes 11 and second electrodes 12 arranged in a sensing region S of the substrate 10. The substrate 10 is light-transmissive and film-shaped and is formed of, for example, poly(ethylene terephthalate) (PET), polycarbonate (PC), cycloolefin polymer (COP), or polyimide (PI). The substrate 10 is preferably flexible.

The first electrodes 11 are arranged in an X direction (first direction) along a main surface 10a of the substrate 10. The second electrodes 12 are arranged in a Y direction (second direction) along the main surface 10a of the substrate 10 and orthogonal to the X direction. The first electrodes 11 are insulated from the second electrodes 12. In the embodiment, the first electrodes 11 are spaced at a predetermined pitch in the Y direction and the second electrodes 12 are spaced at a predetermined pitch in the X direction.

The first electrodes 11 include first transparent electrodes 111. In the embodiment, the first transparent electrodes 111 have a rhombus-like shape and are arranged side by side in the X direction. In other words, the first transparent electrodes 111 are arranged in the X direction. Two adjacent first transparent electrodes 111 are electrically connected by a bridge wiring part 31 of each bridge portion 30. As will be described in detail, the bridge portion 30 includes, in sequence from the top, the bridge wiring part 31, an insulating layer 32, and a buffer layer 33.

The second electrodes 12 include second transparent electrodes 121. The second transparent electrodes 121 have a rhombus-like shape and are arranged one behind the other in the Y direction. In other words, the second transparent electrodes 121 are arranged in the Y direction orthogonal to the X direction. Two adjacent second transparent electrodes 121 are electrically connected by each coupling portion 122.

Each of the first transparent electrodes 111 and the second transparent electrodes 121 is light-transmissive and includes a dispersion layer formed of a material containing conductive nanowires. The coupling portion 122 electrically connecting two adjacent second transparent electrodes 121 also includes the above-described dispersion layer. In other words, the coupling portion 122 is formed integrally with the two second transparent electrodes 121 electrically connected by the coupling portion 122. The conductive nanowires may be at least one selected from the group consisting of gold nanowires, silver nanowires, and copper nanowires. The use of a material containing conductive nanowires allows the first transparent electrodes 111 and the second transparent electrodes 121 to exhibit high light transmissivity and low electrical resistance.

The dispersion layer includes the conductive nanowires and a transparent resin layer (matrix). The conductive nanowires are dispersed in the matrix. The matrix ensures that the conductive nanowires are dispersed in the dispersion layer. Examples of materials (matrix resin materials) for the matrix include acrylic resin, polyester resin, and polyurethane resin. The conductive nanowires are at least partially in contact with each other, thus maintaining the in-plane conductivity of the material containing the conductive nanowires.

When viewed in a direction normal to the main surface 10a, insulating parts 14 are located between the first transparent electrodes 111, the second transparent electrodes 121, and the coupling portions 122. The insulating parts 14 can be formed of a dispersion layer having a configuration similar to that of the dispersion layer included in, for example, the first transparent electrodes 111, and having lower conductivity than the above-described dispersion layer. Examples of processes of reducing the conductivity include a process of converting the characteristics of the conductive nanowires so that the conductive nanowires, which provide conductivity, lose conductivity and a process of removing the conductive nanowires. Therefore, the first transparent electrodes 111, the second transparent electrodes 121, and the coupling portions 122 (which may be collectively referred to as "electrode components 15" hereinafter) can be formed by forming the dispersion layer on the substrate 10 and performing the above-described process of reducing the conductivity of parts of the dispersion layer that correspond to the insulating parts 14.

As illustrated in FIG. 1A, the first electrodes 11 are connected to lead wiring lines 11a extending out of the sensing region S. In addition, the second electrodes 12 are connected to lead wiring lines 12a extending out of the sensing region S. A drive voltage is applied to the first electrodes 11 through the lead wiring lines 11a and a signal indicating a detected current is transmitted from the second electrodes 12 to an external circuit through the lead wiring lines 12a. The lead wiring lines 11a and 12a may be formed of a material containing conductive nanowires similar to the material forming the first transparent electrodes 111 and the second transparent electrodes 121 or may be formed of another metal-based material because the lead wiring lines are not required to be light-transmissive. This allows the lead wiring lines to have high conductivity even if these lines have a narrow width. The lead wiring lines 11a and 12a may have a multilayer structure.

The lead wiring lines 11a and 12a are formed by, for example, screen printing or etching. The first transparent electrodes 111, the second transparent electrodes 121, and the lead wiring lines 11a and 12a may be formed of a photosensitive conductive sheet (or a sheet including dry film resist and a conductive layer). The use of a photosensitive conductive sheet allows the first transparent electrodes 111, the second transparent electrodes 121, and the lead wiring lines 11a and 12a to be formed with high productivity by exposure and development with the sheet applied.

As illustrated in FIGS. 2A and 2B, the first electrodes 11 and the second electrodes 12 are arranged such that each connection between two adjacent first transparent electrodes 111 intersects the corresponding connection between two adjacent second transparent electrodes 121. The bridge portion 30 is disposed at each intersection to prevent contact between the first electrodes 11 and the second electrodes 12 at the intersection.

In the embodiment, each coupling portion 122 is disposed between two adjacent second transparent electrodes 121. Therefore, the second electrodes 12 are configured such that the second transparent electrodes 121 and the coupling portions 122 are alternately arranged in the Y direction. As described above, since the coupling portions 122 are formed integrally with the second transparent electrodes 121, two adjacent second transparent electrodes 121 are provided continuously with each coupling portion 122.

Each bridge portion 30 is disposed between two adjacent first transparent electrodes 111. Therefore, the first electrodes 11 are configured such that the first transparent electrodes 111 and the bridge portions 30 are alternately arranged in the X direction.

A protective layer 50 is disposed over the bridge portion 30 with an optical clear adhesive (OCA) layer 35 therebetween. The protective layer 50 is bonded to the substrate 10 with the OCA layer 35. The protective layer 50 may be formed of any material. For a material forming the protective layer 50, a flexible plastic substrate is preferably used. The OCA layer 35 is, for example, an acrylic adhesive or a double-sided tape.

In the embodiment, each bridge portion 30 includes the bridge wiring part 31, the insulating layer 32, and the buffer layer 33. The bridge wiring part 31 is disposed to join two adjacent first transparent electrodes 111. The bridge wiring part 31 is connected at opposite ends to the first transparent electrodes 111, spans the coupling portion 122 located between the two adjacent first transparent electrodes 111 such that the insulating part 14 is disposed between the coupling portion 122 and each of the first transparent electrodes 111, and electrically connects the two adjacent first transparent electrodes 111.

The insulating layer 32 is disposed between the bridge wiring part 31 and the coupling portion 122 to prevent short circuit between the first transparent electrodes 111 and the second transparent electrodes 121. The insulating layer 32 is formed of, for example, novolac resin (resist). In principle, the insulating layer 32 may be positioned only in an area where the coupling portion 122, the two second transparent electrodes 121 provided continuously with the coupling portion 122, and the bridge wiring part 31 overlap when viewed in the direction normal to the main surface 10a.

To suit manufacturing requirements for stably preventing short circuit between the first transparent electrodes 111 and the second transparent electrodes 121 (relaxing the accuracy of positioning), as illustrated in FIG. 2B, the insulating layer 32 is disposed to extend over parts of the two second transparent electrodes 121 that are close to the coupling portion 122, with which the two second transparent electrodes 121 are provided continuously. Similarly, to suit manufacturing requirements that contribute to preventing the short circuit (relaxing the accuracy of shape of the insulating layer 32), as illustrated in FIG. 2A, the insulating layer 32 is disposed to extend over parts of the two first transparent electrodes 111 that are close to the coupling portion 122, around which the two first transparent electrodes 111 are located. For example, the coupling portion 122 has a rectangular shape having a width of 150 μm×a length of 200 μm and the insulating layer 32 has a square shape of 300 μm×300 μm when viewed in the direction normal to the main surface 10a. The shapes are not limited to these examples. As described above, the insulating layer 32 may have a width that is approximately 0.7 to 2.0 times the length of the coupling portion 122 when viewed in the direction normal to the main surface 10a.

The bridge wiring part 31 is disposed to extend over the surface of the insulating layer 32 and parts of the surfaces of the first transparent electrodes 111 located on opposite sides of the insulating layer 32 in the X direction. The bridge wiring part 31 is formed of, for example, an oxide-based conductive material. Examples of the oxide-based conductive material include ITO, IZO, gallium-doped zinc oxide (GZO), aluminum-doped zinc oxide (AZO), and fluorine-doped zinc oxide (FTO). The oxide-based conductive material is preferably amorphous in terms of higher flexibility. The bridge wiring part 31 may have a multilayer structure.

As illustrated in FIG. 2B, the buffer layer 33 is disposed between the insulating layer 32 and the coupling portion 122. In the embodiment, the insulating layer 32 extends over the parts of the two second transparent electrodes 121 provided continuously with the coupling portion 122 and the parts of the two first transparent electrodes 111 located adjacent to the coupling portion 122 with the insulating parts 14 therebetween. In other words, the insulating layer 32 may include parts extending over the parts of the two second transparent electrodes 121 electrically connected by the coupling portion 122. In addition, the insulating layer 32 may include parts extending over the parts of the two adjacent first transparent electrodes 111 adjacent to the coupling portion 122.

Therefore, as illustrated in FIG. 2A, the buffer layer 33 is located between the insulating layer 32 and each of the above-described parts of the two second transparent electrodes 121 and is also located between the insulating layer 32 and each of the above-described parts of the two first transparent electrodes 111. In other words, the buffer layer 33 may include parts located between the second transparent electrodes 121 and the parts of the insulating layer 32 extending over the second transparent electrodes 121 and may further include parts located between the first transparent electrodes 111 and the parts of the insulating layer 32 extending over the first transparent electrodes 111. As described above, when viewed in the direction normal to the main surface 10a, the buffer layer 33 is located in areas where the insulating layer 32 overlaps the electrode components 15. The buffer layer 33 has a thickness of, for example, approximately 1 nm or more and approximately 20 nm or less.

In the embodiment, the buffer layer 33 is formed of a light-transmissive, inorganic oxide-based material. Examples of the light-transmissive, inorganic oxide-based material include amorphous ITO and amorphous IZO, which are light-transmissive, inorganic oxide-based conductive materials. The light-transmissive, inorganic oxide-based material does not need to be conductive. If the buffer layer 33 is formed of an insulating material, the buffer layer 33 may be located on the insulating parts 14. If the buffer layer 33 is formed of a conductive material, as illustrated in FIG. 2A described above, the buffer layer 33 may be located so as to avoid the insulating parts 14 in order to prevent short circuit between the first transparent electrodes 111, the second transparent electrodes 121, and the coupling portion 122.

The novolac resin used as a material forming the insulating layer 32 exhibits poor adhesion to the electrode components 15 formed of the above-described dispersion layer (layer formed of a material including a matrix and conductive nanowires dispersed in the matrix). Accordingly, if the insulating layer 32 is directly formed on the electrode components 15, for example, the insulating layer 32 may fail to be appropriately formed, it may be difficult to appropriately form the bridge wiring part 31 to be located on the insulating layer 32, or the bridge wiring part 31 may be separated together with the insulating layer 32. Consequently, it may be difficult to stably form the bridge portion 30.

In contrast, the buffer layer 33 exhibits proper adhesion to the insulating layer 32 and also exhibits proper adhesion to the dispersion layer forming the electrode components 15. Therefore, the buffer layer 33, provided in the above-described manner, makes it difficult for the insulating layer 32 to separate from the electrode components 15, leading to stable formation of the bridge portion 30. This enables the bridge wiring part 31 to establish stable electrical communication between two adjacent first transparent electrodes 111.

In terms of reducing the likelihood of separation of the insulating layer 32 from the electrode components 15, as illustrated in FIG. 2A, the buffer layer 33 is preferably located between the insulating layer 32 and the parts of the two adjacent first transparent electrodes 111. In FIG. 2A, since the buffer layer 33 is not disposed on the insulating parts 14, the adhesion of the insulating layer 32 to the insulating parts 14 may be lowered. However, the buffer layer 33 on the electrode components 15 appropriately reduces the likelihood of separation of the insulating layer 32. Furthermore, since the buffer layer 33 is located only on the electrode components 15, recesses are formed in correspondence to the insulating parts 14 as illustrated in FIG. 2A. The insulating layer 32 fills the recesses, producing the anchor effect. This ensures proper adhesion of the insulating layer 32. As described above, the buffer layer 33 may be disposed on the insulating parts 14 as long as the buffer layer 33 is formed of an insulating material.

Furthermore, the buffer layer 33 hinders the material forming the insulating layer 32 from penetrating into the electrode components 15. As described above, the novolac resin used as a material forming the insulating layer 32 exhibits poor adhesion to the matrix resin material (e.g., acrylic resin) of the electrode components 15. If the buffer layer 33 was not provided, the insulating layer 32 would separate from the electrode components 15. If a resist material mainly containing acrylic resin was used for the insulating layer 32 to improve adhesion, the material forming the insulating layer 32 might penetrate into the electrode components 15. The light-transmissivity of parts with such penetration would be lowered, leading to lower invisibility of the bridge portion 30.

However, if the material forming the insulating layer 32 mainly contains acrylic resin, the buffer layer 33 provided in the above-described manner hinders the material forming the insulating layer 32 from penetrating into the electrode components 15, thus preventing a reduction in invisibility of the bridge portion 30. In this case, since the buffer layer 33 is not located at positions on the insulating parts 14 as illustrated in FIG. 2A, the material forming the insulating layer 32 may penetrate into the insulating parts 14 at these positions. However, the ratio of the area of the insulating parts 14 to the total area of the bridge portion 30 is small when viewed in the direction normal to the main surface 10a. The absence of the buffer layer 33 on the insulating parts 14 has little effect on the invisibility of the bridge portion 30. If there is a need to eliminate this effect, the buffer layer 33 may be formed of an insulating material and be disposed on the insulating parts 14.

The buffer layer 33 may be provided not to protrude outward from the insulating layer 32. In other words, when viewed in the direction normal to the main surface 10a, the buffer layer 33 may be provided not to protrude from an outer edge of the insulating layer 32 to the first transparent electrodes 111. If the buffer layer 33 protruded from the outer edge of the insulating layer 32 to the first transparent electrodes 111, the bridge wiring part 31, protruding parts of the buffer layer 33, and the electrode components 15, or three layers, would be in overlying relation with each other. Such arrangement included two interfaces between the layers having different indices of refraction.

In contrast, if the buffer layer 33 does not protrude from the outer edge of the insulating layer 32 to the first transparent electrodes 111, the buffer layer 33 will not be located between the bridge wiring part 31 and the electrode components 15 outside the insulating layer 32. In other words, this arrangement has contact between the bridge wiring part 31 and the electrode components 15, or two layers, and thus has one interface between the layers having different indices of refraction.

Light tends to be reflected at the interface between layers having different indices of refraction. The smaller the number of interfaces, the higher the invisibility. In other words, the invisibility in the arrangement in which the buffer layer 33 is not located between the bridge wiring part 31 and the electrode components 15 is higher than that in the arrangement in which the buffer layer 33 is located therebetween. Therefore, in terms of increasing the invisibility of the bridge portion 30, it is preferred that the buffer layer 33 be disposed so as not to protrude from the outer edge of the insulating layer 32 to the first transparent electrodes 111. In terms of ensuring that the buffer layer 33 is prevented from protruding from the outer edge of the insulating layer 32, it may be preferred that the buffer layer 33 be not disposed on the first transparent electrodes 111.

Figure 3A:
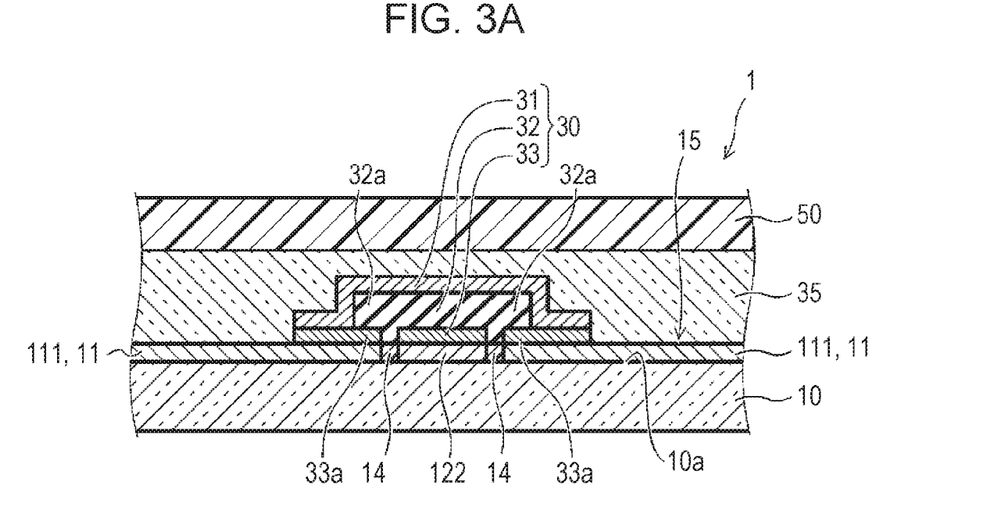
FIGS. 3A and 3B are sectional views illustrating a bridge portion of a capacitive sensor according to a modification of the embodiment.
Figure 3B:
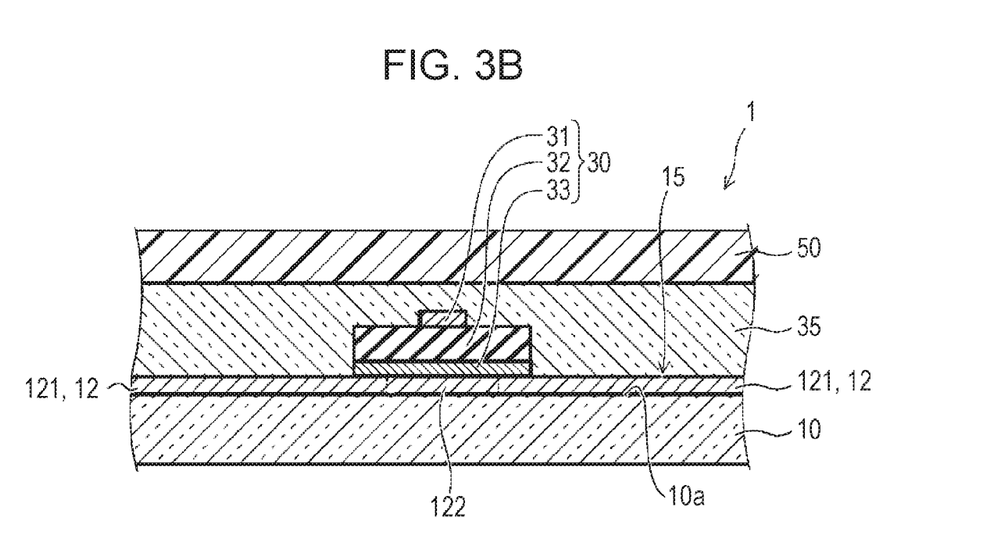

FIGS. 3A and 3B are sectional views illustrating a bridge portion of a capacitive sensor according to a modification of the embodiment. FIG. 3A is a sectional view taken along line IIA-IIA in FIG. 1B. FIG. 3B is a sectional view taken along line IIB-IIB in FIG. 1B. In the modification illustrated in FIG. 3A, the insulating layer 32 includes parts 32a extending over parts of the two adjacent first transparent electrodes 111 arranged at opposite sides of the coupling portion 122. Furthermore, the buffer layer 33 includes parts 33a located between the first transparent electrodes 111 and the parts 32a of the insulating layer 32 extending over the first transparent electrodes 111.

In a case where sufficient invisibility is provided even in such arrangement with the buffer layer 33, as illustrated in FIG. 3A, the buffer layer 33 may be disposed between the bridge wiring part 31 and the electrode components 15.

Examples of such a case include a case where the buffer layer 33 is sufficiently thin. If the buffer layer 33 has a thickness of 15 nm or less, the effect of the buffer layer 33 on the invisibility may be appropriately reduced. If the buffer layer 33 has a thickness of 10 nm or less, good invisibility may be achieved.

The buffer layer 33 may be continuously provided between the insulating layer 32 and the first transparent electrodes 111 and between the bridge wiring part 31 and the first transparent electrodes 111.

The inorganic oxide-based material forming the buffer layer 33 is preferably an amorphous material. For example, the material forming the buffer layer 33 is preferably at least one selected from the group consisting of amorphous ITO and amorphous IZO. This allows the buffer layer 33 to be flexible. Therefore, damage to the buffer layer 33 can be reduced or eliminated even if the capacitive sensor 1 is bent to fit various shapes of an apparatus as an application of the capacitive sensor 1.

The material forming the buffer layer 33 may be set in consideration of its process usability. For example, in a case where the buffer layer 33 is used not only to prevent the material forming the insulating layer 32 from penetrating into the electrode components 15 but also to protect the electrode components 15 from etching, it is preferred that the buffer layer 33 function as an etching stopper layer. Amorphous ITO has higher solubility in an acidic etchant used for etching a metal-based material than amorphous IZO has. In consideration of the above-described viewpoint (process usability), a material suitable for the buffer layer 33 is amorphous ITO rather than amorphous IZO.

Figure 4:
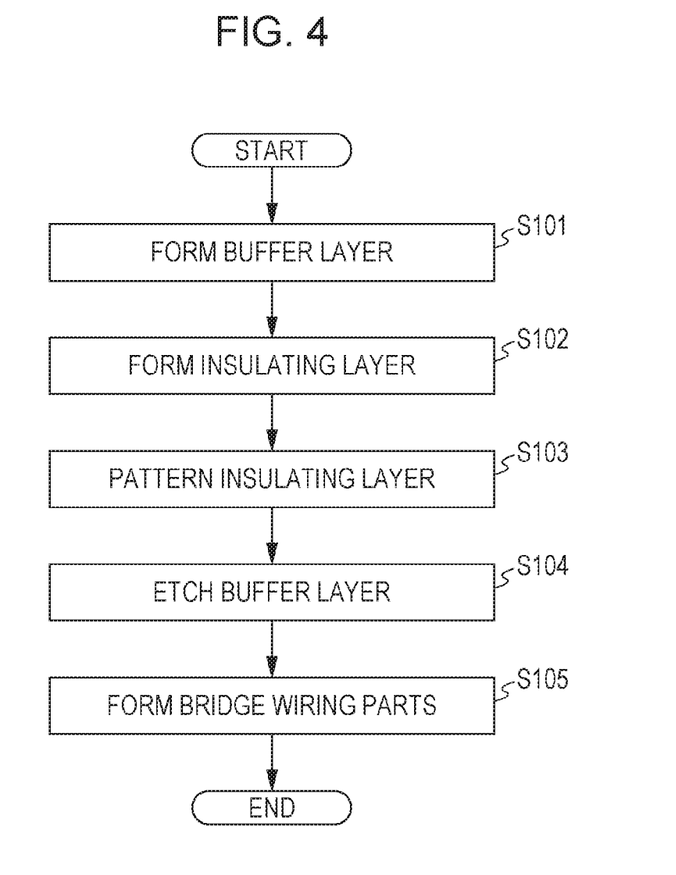
FIG. 4 is a flowchart illustrating a method of fabricating the capacitive sensor according to the embodiment.

FIG. 4 is a flowchart illustrating an exemplary method of fabricating the capacitive sensor according to the embodiment. FIGS. 5A to 5E are sectional views illustrating the method of fabricating the capacitive sensor according to the embodiment.

Figure 5A:
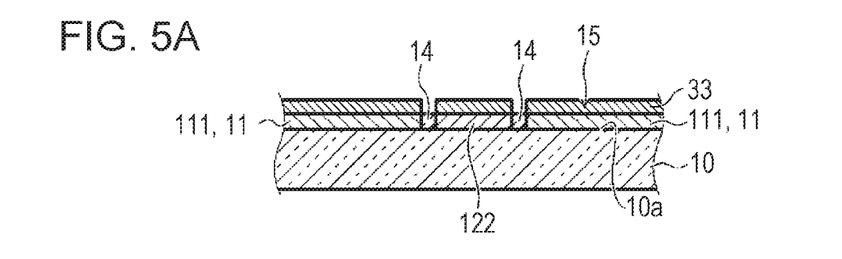
FIGS. 5A to 5E are sectional views illustrating the method of fabricating the capacitive sensor according to the embodiment.

First, as illustrated in step S101 in FIG. 4, the buffer layer 33 is formed. Specifically, as illustrated in FIG. 5A, the electrode components 15 (the first transparent electrodes 111, the second transparent electrodes 121, and the coupling portions 122) are formed on the main surface 10a of the substrate 10, and the buffer layer 33 is formed on the electrode components 15. The electrode components 15 are formed of a dispersion layer including a matrix (e.g., acrylic resin) and conductive nanowires (e.g., silver nanowires) dispersed in the matrix. When viewed in the direction normal to the main surface 10a, the insulating parts 14 are located between the first transparent electrodes 111, the second transparent electrodes 121, and the coupling portions 122. The insulating parts 14 are formed by removing the conductive nanowires from parts of the dispersion layer forming the electrode components 15 to cause the parts to lose conductivity. Specifically, as described in International Publication No. WO 2015/01985, parts of the dispersion layer on the substrate 10 that correspond to the insulating parts 14 are subjected to a process of changing the characteristics of the conductive nanowires and a process of removing the conductive nanowires with the changed characteristics, thus forming patterns of the electrode components 15 surrounded by the insulating parts 14.

On the electrode components 15, the buffer layer 33 formed of a transparent, inorganic oxide-based material (e.g., amorphous ITO) is formed. Then, the buffer layer 33 located only on the insulating parts 14 is removed by etching such that the buffer layer 33 is left only on the electrode components 15 (the first transparent electrodes 111, the second transparent electrodes 121, and the coupling portions 122). In etching the buffer layer 33, selective etching may be performed using the insulating parts 14 as etching stoppers because the insulating parts 14 exhibit sufficiently high insulating properties. For example, assuming that the buffer layer 33 is formed of amorphous ITO and the insulating parts 14 are formed of acrylic resin, the buffer layer 33 may be etched with oxalic acid, which exhibits selectivity to the acrylic resin. In etching the buffer layer 33, the insulating parts 14 may be removed together with the buffer layer 33 by etching.

Figure 5B:
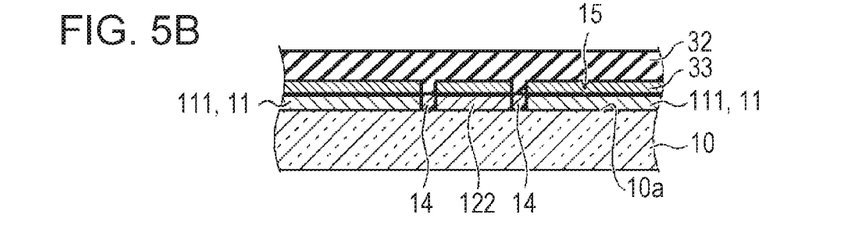

Then, as illustrated in step S102 in FIG. 4, the insulating layer 32 is formed. Specifically, as illustrated in FIG. 5B, the insulating layer 32 is formed to completely cover the electrode components 15 and the insulating parts 14. For the insulating layer 32, novolac resin (resist) is used.

Figure 5C:
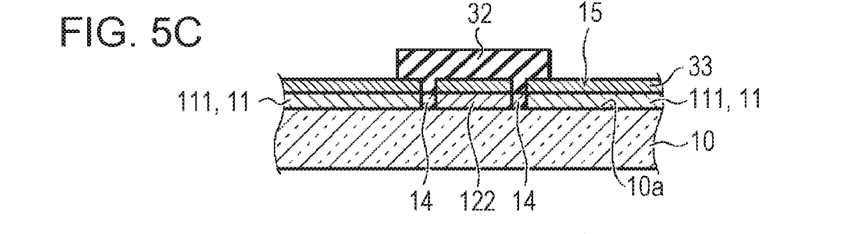

Then, as illustrated in step S103 in FIG. 4, the insulating layer 32 is patterned. Specifically, as illustrated in FIG. 5C, the insulating layer 32 is patterned by photolithography (exposure and development) such that the insulating layer 32 is left only over the coupling portions 122, the parts of the first transparent electrodes 111 around the coupling portions 122, and the parts of the second transparent electrodes 121 around the coupling portions 122 and other parts of the insulating layer 32 are removed. If the insulating layer 32 is formed of an insulating material that is not photosensitive, such as resist, the insulating layer 32 may be patterned by etching. In this case, selective etching may be performed such that the buffer layer 33 underlying the insulating layer 32 functions as an etching stopper.

Figure 5D:
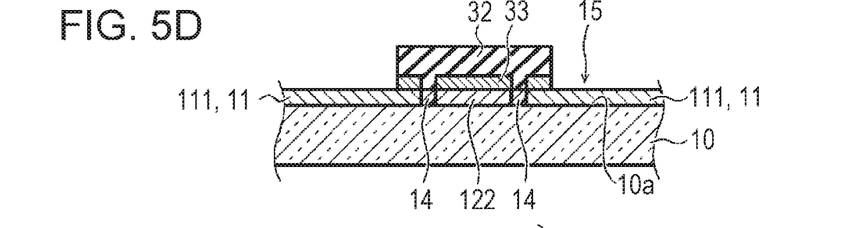

Then, as illustrated in step S104 in FIG. 4, the buffer layer 33 is patterned. Specifically, as illustrated in FIG. 5D, parts of the buffer layer 33 that are located outside the remaining insulating layer 32 are removed by etching. Thus, the surfaces of the first transparent electrodes 111 and the second transparent electrodes 121 are exposed outside the remaining insulating layer 32. In etching the buffer layer 33, selective etching may be performed such that the electrode components 15 function as etching stoppers. For example, assuming that the buffer layer 33 is formed of amorphous ITO and the electrode components 15 are formed of a dispersion layer including acrylic resin and silver nanowires dispersed therein, the buffer layer 33 may be etched using oxalic acid, which exhibits selectivity to the dispersion layer. In etching the buffer layer 33, it is preferred that the insulating layer 32 function as a mask for the buffer layer 33 because the effect of the buffer layer 33 located outside the insulating layer 32 on the invisibility of the bridge portions 30 is stably reduced or eliminated.

Figure 5E:
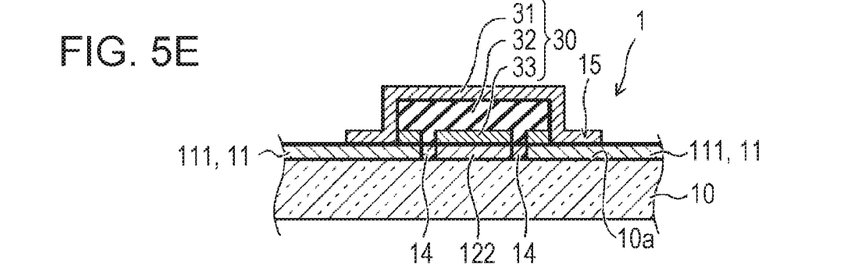

Then, as illustrated in step S105 in FIG. 4, the bridge wiring parts 31 are formed. Specifically, as illustrated in FIG. 5E, each bridge wiring part 31 is formed so as to span the insulating layer 32. The bridge wiring part 31 is formed by photolithography and etching such that the bridge wiring part 31 is elongated and partly extends on the first transparent electrodes 111 on opposite sides of the insulating layer 32 as well as across the insulating layer 32. At this time, selective etching may be performed so that the surfaces of the first transparent electrodes 111 and the second transparent electrodes 121 remain unharmed. Thus, the adjacent first transparent electrodes 111 are electrically connected by the bridge wiring part 31 spanning the insulating layer 32.

After that, as illustrated in FIGS. 2A and 2B, the OCA layer 35 and the protective layer 50 are formed, in sequence, on the bridge portions 30. Thus, the capacitive sensor 1 is completed.

Figure 6:
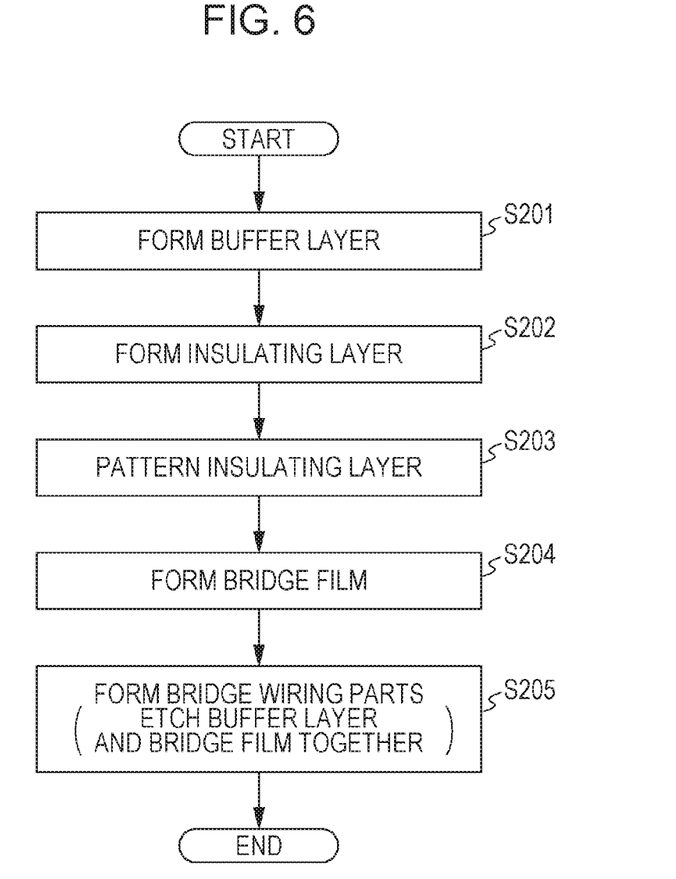
FIG. 6 is a flowchart illustrating a method of fabricating the capacitive sensor according to the modification of the embodiment.

FIG. 6 is a flowchart illustrating a method of fabricating the capacitive sensor according to the modification of the embodiment. FIGS. 7A to 7E are sectional views illustrating the method of fabricating the capacitive sensor according to the modification of the embodiment.

Figure 7A:
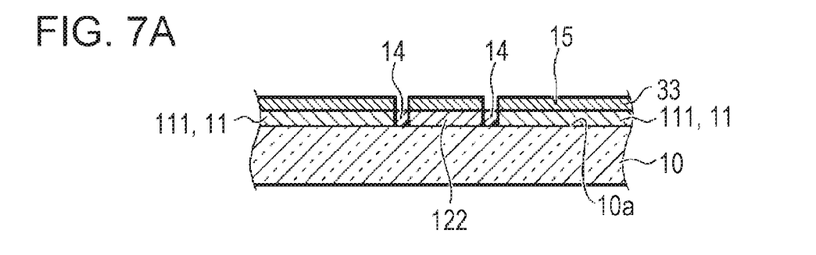
FIGS. 7A to 7E are sectional views illustrating the method of fabricating the capacitive sensor according to the modification of the embodiment.

First, as illustrated in step S201 in FIG. 6, the buffer layer 33 is formed. Specifically, as illustrated in FIG. 7A, the electrode components 15 (the first transparent electrodes 111, the second transparent electrodes 121, and the coupling portions 122) are formed on the main surface 10a of the substrate 10, and the buffer layer 33 is formed on the electrode components 15. The electrode components 15 are formed of a dispersion layer including a matrix (e.g., acrylic resin) and conductive nanowires (e.g., silver nanowires) dispersed in the matrix. When viewed in the direction normal to the main surface 10a, the insulating parts 14 are located between the first transparent electrodes 111, the second transparent electrodes 121, and the coupling portions 122. The insulating parts 14 are formed by removing the conductive nanowires from parts of the dispersion layer forming the electrode components 15 to cause the parts to lose conductivity.

On the electrode components 15, the buffer layer 33 formed of a transparent, inorganic oxide-based material (e.g., amorphous ITO) is formed. Then, the buffer layer 33 located only on the insulating parts 14 is removed by etching such that the buffer layer 33 is left only on the electrode components 15 (the first transparent electrodes 111, the second transparent electrodes 121, and the coupling portions 122).

Figure 7B:
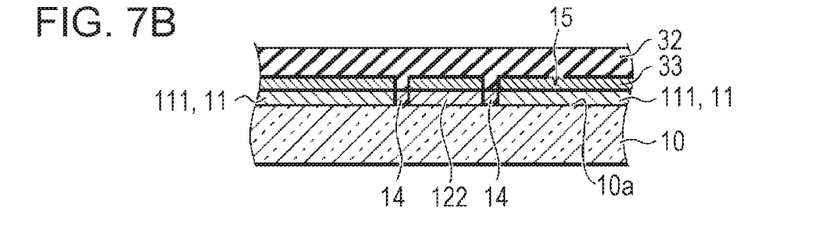

Then, as illustrated in step S202 in FIG. 6, the insulating layer 32 is formed. Specifically, as illustrated in FIG. 7B, the insulating layer 32 is formed. The insulating layer 32 is formed to completely cover the electrode components 15 and the insulating parts 14. For the insulating layer 32, novolac resin (resist) is used.

Figure 7C:
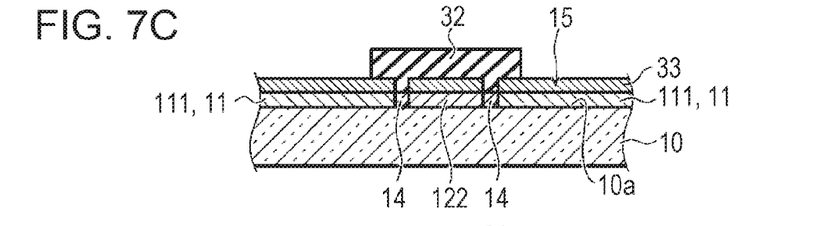

Then, as illustrated in step S203 in FIG. 6, the insulating layer 32 is patterned. In other words, as illustrated in FIG. 7C, the insulating layer 32 is patterned. Specifically, the insulating layer 32 is patterned by photolithography (exposure and development) such that the insulating layer 32 is left only over the coupling portions 122, the parts of the first transparent electrodes 111 around the coupling portions 122, and the parts of the second transparent electrodes 121 around the coupling portions 122 and other parts of the insulating layer 32 are removed. If the insulating layer 32 is formed of an insulating material that is not photosensitive, such as resist, the insulating layer 32 may be patterned by etching. In this case, selective etching may be performed such that the buffer layer 33 underlying the insulating layer 32 functions as an etching stopper.

Figure 7D:
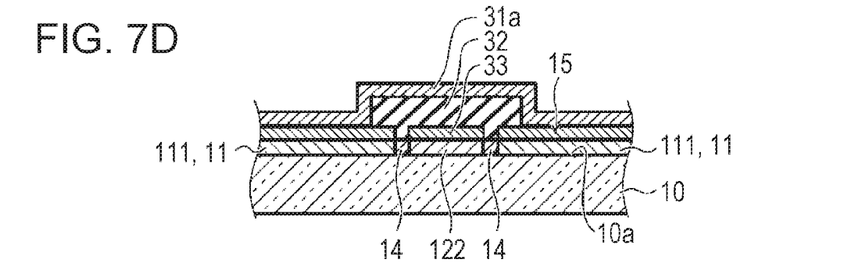

Then, as illustrated in step S204 in FIG. 6, a bridge film 31a for forming the bridge wiring parts 31 is formed. Specifically, as illustrated in FIG. 7D, the bridge film 31a for forming the bridge wiring parts 31 is formed to completely cover the insulating layer 32 and the buffer layer 33. A concrete example of a material forming the bridge film 31a is amorphous ITO.

Figure 7E:
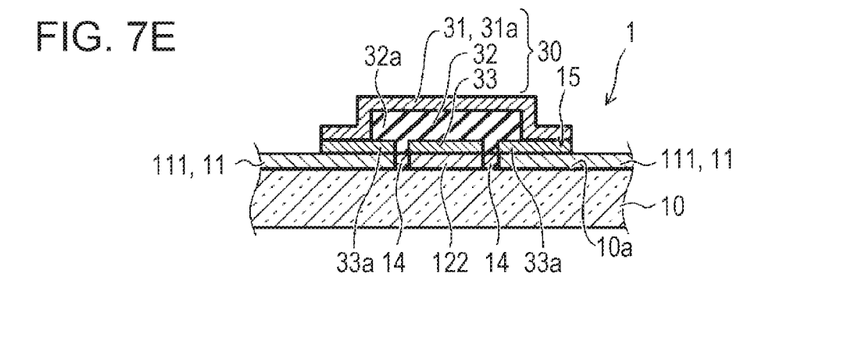

Then, as illustrated in step S205 in FIG. 6, the bridge wiring parts 31 are formed. Specifically, as illustrated in FIG. 7E, the bridge film 31a is etched such that parts of the bridge film 31a that form the bridge wiring parts 31 are left. Since the material forming the buffer layer 33 is the same as that forming the bridge film 31a, or amorphous ITO, the buffer layer 33 underlying the bridge film 31a is also etched with an etchant for etching the bridge film 31a. In other words, the bridge film 31a and the buffer layer 33 are etched together in a single step. Thus, the surfaces of the first transparent electrodes 111 and the second transparent electrodes 121 are exposed. The parts of the bridge film 31a that form the bridge wiring parts 31 are protected by resist, so that the buffer layer 33 underlying the parts is also left without being etched.

Furthermore, the buffer layer 33 underlying the insulating layer 32 is also left without being etched because the insulating layer 32 functions as a protective film. Thus, each bridge wiring part 31, which is elongated and partly extends on the surface of the buffer layer 33 on opposite sides of the insulating layer 32 as well as across the insulating layer 32, is formed on the buffer layer 33 so as to span the insulating layer 32. As a result, the adjacent first transparent electrodes 111 are electrically connected by the bridge wiring part 31 located on the buffer layer 33 and spanning the insulating layer 32.

After that, as illustrated in FIGS. 3A and 3B, the OCA layer 35 and the protective layer 50 are formed, in sequence, on the bridge portions 30. Thus, the capacitive sensor 1 having a structure illustrated in FIGS. 3A and 3B is completed.

The fabrication method illustrated in FIGS. 6 and 7 has the following advantages as compared with the fabrication method illustrated in FIGS. 4 and 5. Fabrication steps illustrated in the flowcharts of FIGS. 4 and 6 are not necessarily continuously performed. Each period of time (interval) between two successive steps may vary. Concrete examples of such a case include a case where a step is continuous processing and the subsequent step is batch processing. More specifically, step S104 (etching of the buffer layer) in FIG. 4 and step S105 (formation of the bridge wiring parts) in FIG. 4 have such a relationship.

In fabricating the capacitive sensor using the method illustrated in FIGS. 5A to 5E, there is a time interval between the processing step of FIG. 5D and the processing step of FIG. 5E. Upon completion of the processing step of FIG. 5D, parts of the electrode components 15 (the first transparent electrodes 111) on which each bridge wiring part 31 is to be formed are exposed. Assuming that the conductive nanowires contained in the electrode components 15 (the first transparent electrodes 111) include silver nanowires, if a product is left standing after completion of the processing step of FIG. 5D, the silver nanowires contained in the electrode components 15 (the first transparent electrodes 111) may react with a substance (e.g., oxygen or sulfur) in an atmosphere to form resistance components. Upon formation of the bridge wiring parts 31 in the processing step of FIG. 5E, the resistance components formed in that manner may result in an increase in resistance between each bridge wiring part 31 and the electrode components 15 (the first transparent electrodes 111).

In contrast, in fabricating the capacitive sensor using the method summarized in the flowchart of FIG. 6 and specifically illustrated by steps in FIGS. 7A to 7E, the electrode components 15 (the first transparent electrodes 111) are not exposed during the method from the state of FIG. 7A until the bridge film 31a and the buffer layer 33 are etched together in a single step as illustrated in FIG. 7E. In other words, the buffer layer 33 functions as a protective film for the electrode components 15 (the first transparent electrodes 111) before the processing step of FIG. 7E. This retards deterioration (e.g., oxidation or sulfuration) of the parts, on which the bridge wiring parts 31 are to be formed, of the electrode components 15 (the first transparent electrodes 111) if there is a time interval between the processing step of FIG. 7C or 7D and the subsequent processing step. Thus, in fabricating the capacitive sensor using the fabrication method of FIGS. 7A to 7E, the resistance between each bridge wiring part 31 and the electrode components 15 (the first transparent electrodes 111) is unlikely to increase.

For the material of the buffer layer 33, amorphous ITO is easier to use than amorphous IZO in terms of being used as an etching stopper layer for a metal-based material. The lead wiring lines 11a and 12a, which are located outside the sensing region S, are not required to be light-transmissive. For this reason, the lead wiring lines 11a and 12a may be formed of a metal-based material in terms of higher conductivity. In such a case, the following process may be used. A layer of a metal-based material is formed on the layer forming the electrode components 15 and is then patterned by etching, thus forming the lead wiring lines 11a and 12a.

If the above-described process is used, the buffer layer 33 may be formed on the electrode components 15 before a layer of a metal-based material is formed on the electrode components 15, so that the buffer layer 33 can protect the conductive nanowires contained in the electrode components 15 from an etchant for etching the metal-based material. In other words, the buffer layer 33 can be used as an etching stopper layer. When used for this purpose, the buffer layer 33 is required to have low solubility in acidic etchants. From this viewpoint, amorphous ITO, which is less soluble in acidic etchants than amorphous IZO, is a material suitable for the buffer layer 33.

Experiments on adhesion, invisibility, and process usability were performed using different insulating layers 32 and different buffer layers 33 arranged on the electrode components 15 and different conditions between each bridge wiring part 31 and the electrode components 15 (the first transparent electrodes 111). Table 1 illustrates experimental results.

TABLE 1

| No. | Insulating Layer | Buffer Layer | Film between Bridge Wiring Part and First Transparent Electrodes | Adhesion of Insulating Layer | Invisibility, Process Usability |
|---|---|---|---|---|---|
| 1 | novolac-based | none | none | 0/100: poor | not evaluated (bridge wiring parts were not formed) |
| 2 | novolac-based | amorphous ITO: 5 nm | none | 100/100: good | very hard to see (very little floating): excellent |
| 3 | novolac-based | amorphous ITO: 10 nm | none | 100/100: good | hard to see: good |
| 4 | novolac-based | amorphous ITO: 15 nm | none | 100/100: good | hard to see: good |
| 5 | novolac-based | amorphous IZO: 15 nm | none | 100/100: good | hard to see: good |
| 6 | novolac-based | amorphous ITO: 10 nm | ITO: 10 nm | 100/100: good | hard to see: good |
| 7 | novolac-based | amorphous ITO: 15 nm | ITO: 15 nm | 100/100: good | floating was observed in overlaps between bridge wiring parts and buffer layer: acceptable |

TABLE 1-continued

| No. | Insulating Layer | Buffer Layer | Film between Bridge Wiring Part and First Transparent Electrodes | Adhesion of Insulating Layer | Invisibility, Process Usability |
|---|---|---|---|---|---|
| 8 | novolac-based | amorphous IZO: 10 nm | IZO: 10 nm | 100/100: good | hard to see: good, soluble in acidic etchant |
| 9 | acrylic | none | none | 100/100: good | color migration from insulating layer to electrode components was observed: poor |

In the experiments, the adhesion of the insulating layer 32 to the electrode components 15 of each of Samples 1 to 9 was measured using a cross-cut adhesion test (100-square test). Furthermore, the invisibility (the extent of being hard to see) of the bridge portion 30 formed of ITO of each sample was sensorily evaluated. In addition, for the samples with a film located between each bridge wiring part 31 and the electrode components 15, the solubility of the film in an acidic etchant was determined.

Sample 1 included the insulating layer 32 formed of novolac-based resin and included no buffer layer 33. The buffer layer 33 was not provided outside the insulating layer 32. In Sample 1 including no buffer layer 33 subjected to the cross-cut adhesion test, the number of squares remaining adhered was 0/100. In other words, all of the squares were removed. Therefore, this resulted in poor adhesion. Since Sample 1 exhibited poor adhesion, the bridge wiring parts 31 were not formed. Consequently, the invisibility of the bridge portions 30 was not evaluated.

Sample 2 included the insulating layer 32 formed of novolac-based resin and the buffer layer 33 formed of amorphous ITO with a thickness of 5 nm. In Sample 2 including the buffer layer 33 located between the insulating layer 32 and the electrode components 15 subjected to the cross-cut adhesion test, the number of squares remaining adhered was 100/100. In other words, no square was removed. Therefore, this resulted in good adhesion. For the invisibility of the bridge portions 30, the bridge portions 30 were very difficult to see and floating was very little. This resulted in excellent invisibility.

Sample 3 had a configuration similar to that of Sample 2 but differed from Sample 2 in that the buffer layer 33 located between each bridge wiring part 31 and the insulating layer 32 had a thickness of 10 nm. In Sample 3 subjected to the cross-cut adhesion test, the number of squares remaining adhered was 100/100. In other words, no square was removed. Therefore, this resulted in good adhesion. For the invisibility of the bridge portions 30, the bridge portions 30 were sufficiently invisible. This resulted in good invisibility.

Sample 4 had a configuration similar to that of Sample 2 but differed from Sample 2 in that the thickness of the buffer layer 33 was 15 nm. In Sample 4 subjected to the cross-cut adhesion test, the number of squares remaining adhered was 100/100. In other words, no square was removed. Therefore, this resulted in good adhesion. For the invisibility of the bridge portions 30, the bridge portions 30 were sufficiently invisible. This resulted in good invisibility.

Sample 5 had a configuration similar to that of Sample 4 but differed from Sample 4 in that the buffer layer 33 was formed of amorphous IZO. In Sample 5 subjected to the cross-cut adhesion test, the number of squares remaining adhered was 100/100. In other words, no square was removed. Therefore, this resulted in good adhesion. For the invisibility of the bridge portions 30, the bridge portions 30 were sufficiently invisible. This resulted in good invisibility.

Sample 6 had a configuration (the thickness of the buffer layer 33: 10 nm) similar to that of Sample 3 but differed from Sample 3 in that the buffer layer 33 (formed of amorphous ITO) having a thickness of 10 nm was left on the first transparent electrodes 111 located outside the insulating layer 32. Accordingly, the bridge wiring parts 31 were connected to the first transparent electrodes 111 by the buffer layer 33. In Sample 6 subjected to the cross-cut adhesion test, the number of squares remaining adhered was 100/100. In other words, no square was removed. Therefore, this resulted in good adhesion. For the invisibility of the bridge portions 30, the bridge portions 30 were sufficiently invisible. This resulted in good invisibility. This result demonstrates that, even in the case where the buffer layer 33 is located between each bridge wiring part 31 and the first transparent electrodes 111, good invisibility can be achieved as long as the buffer layer 33 has an appropriate thickness.

Sample 7 had a configuration similar to that of Sample 6 but differed from Sample 6 in that the buffer layer 33 formed of amorphous ITO and including parts located on the first transparent electrodes 111 outside the insulating layer 32 had a thickness of 15 nm. For the adhesion of this sample, the same result as that of Sample 6 was obtained. For the invisibility of the bridge portions 30, since the thickness of the buffer layer 33 interposed between each bridge wiring part 31 and the electrode components 15 located outside the insulating layer 32 was 15 nm, a large number of overlaps between the layers having different indices of refraction led to floating. As a result, floating was observed. This result is shown as "acceptable" in Table 1.

Sample 8 had a configuration similar to that of Sample 6 but differed from Sample 6 in that the buffer layer 33 provided on the first transparent electrodes 111 located outside the insulating layer 32 was formed of IZO. For the evaluated adhesion and invisibility, the same results as those of Sample 6 were obtained (good adhesion, good invisibility). For evaluated solubilities in the acidic etchant for etching a copper-based material, the buffer layer 33 formed of an ITO film in Sample 6 exhibited low solubility in the acidic etchant, whereas the buffer layer 33 formed of an IZO film in Sample 8 exhibited high solubility in the acidic etchant. This demonstrates that the buffer layers 33, each formed of an ITO film, in Samples 6 and 7 can be used as a member for protecting the first transparent electrodes 111 from the etchant and the buffer layer 33 formed of an IZO film in Sample 8 is difficult to use as such a protecting film.

Sample 9 had a configuration similar to that of Sample 1 but differed from Sample 1 in that the insulating layer 32 was formed of acrylic resin. In Sample 9 subjected to the cross-cut adhesion test, the number of squares remaining adhered was 100/100. In other words, no square was removed. Therefore, this resulted in good adhesion. However, the material forming the insulating layer 32 penetrated into the electrode components 15, resulting in poor invisibility of the bridge portions 30.

The following experiments were performed to determine differences between the configuration of FIGS. 2A and 2B and the configuration of FIGS. 3A and 3B. Table 2 illustrates experimental results.

TABLE 2

|  | Environmental Test | | | | | |
| --- | --- | --- | --- | --- | --- | --- |
|  | Not Performed | | | Performed | | |
| Measuring Time (hour) | 0 | 24 | 48 | 0 | 24 | 48 |
| Configuration 1 | 0 | 6.1 | 18.2 | 4.0 | 16.2 | 51.5 |
| Configuration 2 | 0 | 0.0 | 1.1 | 3.2 | 3.2 | 3.2 |

A configuration (Configuration 1) illustrated in FIGS. 2A and 2B, or a configuration including no buffer layer 33 between the bridge wiring part 31 and the first transparent electrodes 111, and a configuration (Configuration 2) illustrated in FIGS. 3A and 3B, or a configuration including the buffer layer 33 (formed of amorphous ITO) having a thickness of 10 nm provided on the first transparent electrodes 111 located outside the insulating layer 32 and interposed between the bridge wiring part 31 and the first transparent electrodes 111, were prepared. Configuration 1 corresponds to the above-described Sample 3 and Configuration 2 corresponds to the above-described Sample 6.

In samples having the above-described configurations, wiring resistances of the first electrodes 11 arranged in the X direction were measured. For the timing of measurement, measurement was performed just after fabrication (0 hours), after 24 hours, and after 48 hours. Some of the samples were subjected to an environmental test (at 85% relative humidity and a temperature of 85° C. for 168 hours) just after fabrication. In the samples subjected to the environmental test, wiring resistances were measured just after the test (0 hours), after 24 hours, and after 48 hours. Table 2 illustrates measurement results. In Table 2, each value indicates an increase in resistance (unit: %) compared to a reference measured just after fabrication (0 hours) of the sample.

As illustrated in Table 2, for Configuration 1 including no buffer layer 33 between the bridge wiring part 31 and the first transparent electrodes 111, the wiring resistance increased over time. This tendency was remarkable in Configuration 1 subjected to the environmental test. In contrast, in Configuration 2 including the buffer layer 33 interposed between the bridge wiring part 31 and the first transparent electrodes 111, little increase in resistance with time was observed. In Configuration 2 subjected to the environmental test, an increase in resistance was very little as compared with Configuration 1.

An example of application of the capacitive sensor 1 as an example of the input device according to the embodiment will now be described.

Figure 8:
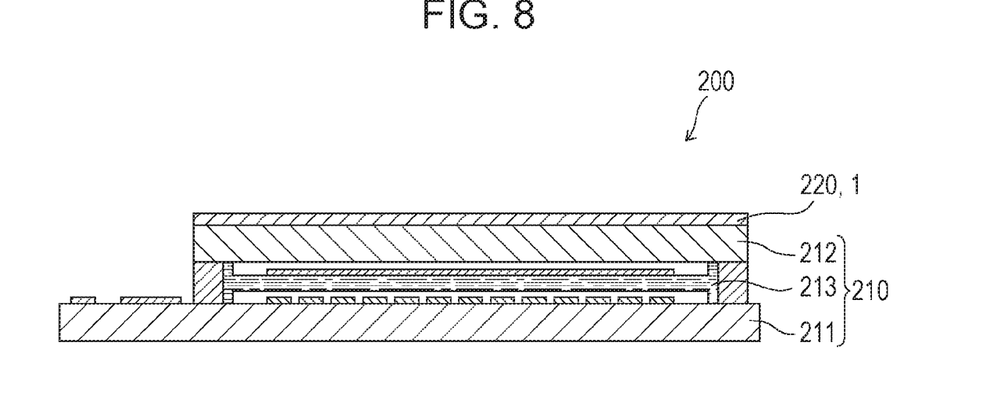
FIG. 8 is a schematic diagram illustrating an application of the capacitive sensor according to the embodiment.

FIG. 8 is a schematic diagram illustrating an example of application of the capacitive sensor according to the embodiment. FIG. 8 illustrates an example of application of the capacitive sensor 1 to a touch panel 200, which is an example of a display apparatus with an input device. The touch panel 200 includes a display panel 210 and a touch sensor 220 disposed on the display panel 210. The touch sensor 220 includes the capacitive sensor 1. For the display panel 210, for example, a liquid crystal display panel is used. The display panel 210, which is a liquid crystal display panel, includes a drive substrate 211 and a counter substrate 212 facing toward each other. A liquid crystal layer 213 is interposed between the drive substrate 211 and the counter substrate 212. The touch sensor 220 is disposed on a front surface of the counter substrate 212.

As described above, the embodiment can provide the capacitive sensor 1 (input device) with sufficient adhesion of the bridge portion 30 to the electrode components 15 at each of the intersections of the transparent electrodes and with no or little degradation in optical characteristics (particularly, no or little reduction in invisibility of the bridge portion 30) and the touch panel 200 (display apparatus with the input device).

Although the embodiment and the modification have been described above as examples, the present invention is not limited to these examples. For example, for the materials of the electrode components 15, the bridge wiring part 31 (bridge film 31a), the insulating layer 32, and the buffer layer 33, a material other than the above-described materials can be used as long as the material achieves advantages similar to those of the present invention. Furthermore, those skilled in the art can modify the above-described embodiment and modification by appropriate addition, elimination, and design change of the components and by appropriate combination of the features of exemplary configurations of the above-described embodiment and modification. Such modifications are also encompassed within the scope of the present invention as long as they do not depart from the spirit and scope of the present invention.

What is claimed is:

1. An input device comprising:
   a light-transmissive substrate having a sensing region;
   a plurality of first transparent electrodes provided in the sensing region and arranged in a first direction, the first transparent electrodes being formed of a light-transmissive material in which conductive nanowires are dispersed in a transparent matrix resin;
   a plurality of second transparent electrodes provided in the sensing region and arranged in a second direction orthogonal to the first direction, the second transparent electrodes being formed of a light-transmissive material in which conductive nanowires are dispersed in the transparent matrix resin, the plurality of second transparent electrodes being electrically insulated from the plurality of first transparent electrodes;
   a plurality of coupling portions each electrically connecting adjacent two of the second transparent electrodes, the coupling portions being formed of a light-transmissive material in which conductive nanowires are dispersed in the transparent matrix resin;
   a plurality of insulating parts provided between the first transparent electrodes and the second transparent electrodes, and between the first transparent electrodes and the coupling portions, the insulating parts being formed of a same material as the transparent matrix resin which is an acrylic resin, and provided continuously, in a same layer, with the first transparent electrodes, the second transparent electrodes, and the coupling portions; and
   a plurality of bridge portions disposed over the coupling portions so as to electrically connect adjacent two of the first transparent electrodes,
   wherein each of the bridge portions includes:
      a bridge wiring part connecting the two adjacent first transparent electrodes;
      an insulating layer disposed between the bridge wiring part and the coupling portion, the insulating layer including:

first extending portions extending over adjacent portions of the two adjacent first transparent electrodes, the adjacent portions opposing each other across the coupling portion interposed therebetween; and second extending portions extending over end portions of the two adjacent second transparent electrodes which are electrically connected by the coupling portion therebetween;

a buffer layer disposed between the insulating layer and the coupling portion, the buffer layer including portions disposed between the first extending portions of the insulating layer and the adjacent portions of the two adjacent first transparent electrodes, and the buffer layer extending over the end portions of the two adjacent second transparent electrodes so as to be interposed between the second extending portions of the insulating layer and the end portions of the two adjacent second transparent electrodes, the buffer layer not being disposed over the insulating parts, whereby recesses lacking the buffer layer are formed above the insulating parts, the buffer layer being formed of a light-transmissive, inorganic oxide-based material which is at least one element selected from the group consisting of amorphous indium tin oxide (ITO) and amorphous indium zinc oxide (IZO), and wherein the insulating layer is formed of a novolac resin, the insulating layer filling the recesses and being in contact with the insulating parts.

2. The input device according to claim 1, wherein the buffer layer is also disposed between the bridge wiring part and the first transparent electrodes.

3. The input device according to claim 2, wherein the buffer layer is continuously provided between the insulating layer and the first transparent electrodes and between the bridge wiring part and the first transparent electrodes.

4. The input device according to claim 1, wherein the conductive nanowires are formed of at least one element selected from the group consisting of gold nanowires, silver nanowires, and copper nanowires.

5. A display apparatus comprising:
a display panel; and
a touch sensor disposed on the display panel, the touch sensor including the input device according to claim 1.

6. An input device comprising:
a light-transmissive substrate having a sensing region;
a plurality of first transparent electrodes provided in the sensing region and arranged in a first direction, the first transparent electrodes being formed of a light-transmissive dispersion layer in which conductive nanowires are dispersed in a transparent matrix resin which is an acrylic resin;
a plurality of second transparent electrodes provided in the sensing region and arranged in a second direction orthogonal to the first direction, the second transparent electrodes being formed of the light-transmissive dispersion layer, the plurality of second transparent electrodes being electrically insulated from the plurality of first transparent electrodes;

a plurality of coupling portions each electrically connecting adjacent two of the second transparent electrodes, the coupling portions being formed of the light-transmissive dispersion layer, integrally with the second transparent electrodes;

a plurality of insulating parts provided between the first transparent electrodes and the second transparent electrodes, and between the first transparent electrodes and the coupling portions, the insulating parts being formed of a same material as the transparent matrix resin of the light-transmissive dispersion layer, the insulating parts being provided continuously, in a same layer, with the first transparent electrodes, the second transparent electrodes, and the coupling portions; and a plurality of bridge portions disposed over the coupling portions so as to electrically connect adjacent two of the first transparent electrodes, wherein each of the bridge portions includes:
a bridge wiring part connecting the two adjacent first transparent electrodes;

an insulating layer disposed between the bridge wiring part and the coupling portion, the insulating layer including:

first extending portions extending over adjacent portions of the two adjacent first transparent electrodes, the adjacent portions opposing each other across the coupling portion interposed therebetween; and second extending portions extending over end portions of the two adjacent second transparent electrodes connected by the coupling portion therebetween;

a buffer layer disposed between the insulating layer and the coupling portion, the buffer layer including:

first parts disposed on the adjacent portions of the two adjacent first transparent electrodes under the first extending portion of the insulating layer;

second parts disposed on the end portions of the two adjacent second transparent electrodes under the second extending portions of the insulating layer, wherein the buffer layer is not disposed on the insulating parts, whereby recesses lacking the buffer layer are formed above the insulating parts, the buffer layer being formed of a light-transmissive, inorganic oxide-based material, and wherein the insulating layer fills the recesses to be in contact with the insulating parts, without touching respective side surfaces of the first transparent electrode, the second transparent electrode, and the coupling portions.

7. The input device according to claim 6, wherein the insulating layer is formed of a novolac resin.

8. The input device according to claim 6, wherein the inorganic oxide-based material is an amorphous material.

9. The input device according to claim 6, wherein the buffer layer is formed of at least one element selected from the group consisting of amorphous indium tin oxide (ITO) and amorphous indium zinc oxide (IZO).

* * * * *